United States Patent
Mohr et al.

(10) Patent No.: US 9,311,570 B2
(45) Date of Patent: Apr. 12, 2016

(54) METHOD OF, AND APPARATUS FOR, SEGMENTATION OF STRUCTURES IN MEDICAL IMAGES

(71) Applicants: Kabushiki Kaisha Toshiba, Minato-ku (JP); Toshiba Medical Systems Corporation, Otawara-shi (JP)

(72) Inventors: Brian Mohr, Edinburgh (GB); Marco Razeto, Edinburgh (GB)

(73) Assignees: KABUSHIKI KAISHA TOSHIBA, Minato-ku (JP); TOSHIBA MEDICAL SYSTEMS CORPORATION, Otawara-shi (JP)

( * ) Notice: Subject to any disclaimer, the term of this patent is extended or adjusted under 35 U.S.C. 154(b) by 0 days.

(21) Appl. No.: 14/099,092

(22) Filed: Dec. 6, 2013

(65) Prior Publication Data
US 2015/0161782 A1    Jun. 11, 2015

(51) Int. Cl.
*G06K 9/00* (2006.01)
*G06K 9/62* (2006.01)
*G06T 7/00* (2006.01)

(52) U.S. Cl.
CPC ............ *G06K 9/627* (2013.01); *G06K 9/00536* (2013.01); *G06T 7/0081* (2013.01); *G06T 7/0091* (2013.01); *G06T 2207/10081* (2013.01); *G06T 2207/10088* (2013.01); *G06T 2207/10104* (2013.01); *G06T 2207/10108* (2013.01); *G06T 2207/20148* (2013.01); *G06T 2207/30101* (2013.01)

(58) Field of Classification Search
None
See application file for complete search history.

(56) References Cited

U.S. PATENT DOCUMENTS

| 5,602,891 | A  |   | 2/1997 | Pearlman |
| 7,995,824 | B2 | * | 8/2011 | Yim ...................... A61B 6/481 382/130 |

(Continued)

FOREIGN PATENT DOCUMENTS

| JP | 5-336447    | 12/1993 |
| JP | 2006-181149 | 7/2006  |

OTHER PUBLICATIONS

Marco Razeto, et al., "Accurate Registration of Coronary Arteries for Volumetric CT Digital Subtraction Angiography", International Conference on Graphic and Image Processing (Proc. of SPIE), vol. 8768, 2013, 6 pages.

(Continued)

*Primary Examiner* — Shervin Nakhjavan
(74) *Attorney, Agent, or Firm* — Oblon, McClelland, Maier & Neustadt, L.L.P.

(57) ABSTRACT

An apparatus for segmentation of medical image data comprises a data processing unit for obtaining a first set of image data and a second set of image data, wherein a structure is represented in both the first set of image data and the second set of image data, a classification unit configured to determine a classification of a first type of feature from the first set of image data and to determine a classification of a second type of feature from the second set of image data, and a segmentation unit configured to identify image data representing the structure in dependence on both the classification of the first type of feature from the first set of image data and the classification of the second type of feature from the second set of image data.

23 Claims, 12 Drawing Sheets

(56) References Cited

U.S. PATENT DOCUMENTS

| | | | |
|---|---|---|---|
| 2004/0042677 A1* | 3/2004 | Lee | 382/254 |
| 2006/0036167 A1* | 2/2006 | Shina | A61B 6/12 600/433 |
| 2006/0280352 A1* | 12/2006 | Muschler et al. | 382/128 |
| 2007/0053554 A1* | 3/2007 | Fayad et al. | 382/128 |
| 2007/0160276 A1* | 7/2007 | Chen et al. | 382/128 |
| 2007/0165920 A1* | 7/2007 | Gering et al. | 382/128 |
| 2008/0080757 A1 | 4/2008 | Scheuering et al. | |
| 2009/0129661 A1* | 5/2009 | Licato | 382/134 |
| 2009/0161939 A1 | 6/2009 | Wu et al. | |
| 2010/0111390 A1* | 5/2010 | Fenchel et al. | 382/131 |
| 2011/0019889 A1* | 1/2011 | Gering et al. | 382/131 |
| 2011/0050897 A1* | 3/2011 | Cobb et al. | 348/143 |
| 2011/0081062 A1* | 4/2011 | Li et al. | 382/131 |
| 2013/0039558 A1* | 2/2013 | Balter et al. | 382/131 |
| 2013/0102877 A1* | 4/2013 | Mori et al. | 600/410 |
| 2013/0322724 A1* | 12/2013 | Florent | A61B 6/12 382/132 |
| 2014/0112566 A1* | 4/2014 | Steinberg | G06T 7/0022 382/131 |

OTHER PUBLICATIONS

Michiel Schaap, et al., "Bayesian Tracking of Tubular Structures and Its Application to Carotid Arteries in CTA", Proceedings of International Conference on Medical Image Computing and Computer-Assisted Intervention, MICCAI, vol. 10, Jan. 2007, pp. 562-570

Jose L. Marroquin, et al., "Some Extensions of the K-Means Algorithm for Image Segmentation and Pattern Classification", Massachusetts Institute of Technology Artificial Intelligence Laboratory, AI Memo 1390, Jan. 1993, 23 pages.

Brian Mohr, et al., "Accurate Lumen Segmentation and Stenosis Detection and Quantification in Coronary CTA", Proc. of MICCAI Workshop '3D Cardiovascular Imaging, a MICCAI Segmentation Challenge, 2012, 8 pages.

Yan Yang, et al., "Knowledge.-Based 3D Segmentation and Reconstruction of Coronary Arteries Using CT Images", Proceedings of the 26th Annual International Conference of the IEEE EMBS, Sep. 1-5, 2004, pp. 1664-1666.

Marco Razeto, et al., "Accurate Registration of Coronary Arteries for Volumetric CT Digital Subtraction Angiography", International Conference on Graphic and Image Processing (Proc. of SPIE); vol. 8768, 2013, 6 pages.

Cemil Kirbas, et al., "A Review of Vessel Extraction Techniques and Algorithms", ACM Computing Surveys, vol. 36, No. 2, Jun. 2004, pp. 81-121.

Shyh-Roei Wang, et al., "Dual Snake-Based Vessel Wall Detection for MSCT Coronary Artery Analysis", Journal of Medical and Biological Engineering, vol. 27, No. 4, 2007, pp. 165-171.

Stefan Grosskopf, et al., "Accurate, Fast and Robust Vessel Contour Segmentation of CTA using an Adaptive Self-Learning Edge Model", Proc. of SPIE, vol. 7259, 2009, pp. 72594D-1-72594D-8.

Sebastian Zambal, et al., "Shape and Appearance Models for Automatic Coronary Artery Tracking", Insight Journal, Release 0.22, Aug. 11, 2008, 8 pages.

Karim Lekadir, et al., "Carotid Artery Segmentation using an Outlier Immune 3D Active Shape Models Framework", Proceedings of International Conference on Medical Image Computing and Computer-Assisted Intervention, vol. 9, Jan. 2006, pp. 620-627.

Daniel Rinck, et al., "Shape-based Segmentation and Visualization Techniques for Evaluation of Atherosclerotic Plaques in Coronary Artery Disease", Proc. of SPIE, vol. 6141, 2006, pp. 61410G-1-61410G-9.

Charles Florin, et al., "Particle Filters, a Quasi-Monte-Carlo-Solution for Segmentation of Coronaries", In Proceedings: International Conference on Medical Image Computing and Computer-Assisted Intervention, 2005, pp. 246-253.

Stefan Wörz, et al., "Segmentation of 3D Tubular Structures Based on 3D Intensity Models and Particle Filter Tracking" Proc. of SPIE, vol. 7259, 2009, pp. 72591P-1-72591P-8.

Fred N. Kiwanuka, et al., "Automatic Attribute Threshold Selection for Blood Vessel Enhancement", International Conference on Pattern Recognition, vol. 2306, 2010, pp. 2314-2317.

B. Bouraoui, et al., "Fully Automatic 3D Segmentation of Coronary Arteries Based on Mathematical Morphology", International Symposium on Biomedical Imaging, ISBI, 2008, pp. 1059-1062.

Sushil Mittal, et al., "Fast Automatic Detection of Calcified Coronary Lesions in 3D Cardiac CT Images", Machine Learning in Medical Imaging, 2010, pp. 1-9.

Mark E. Olszewski, et al., "Quantitative analysis of vascular dimension and plaque composition in coronary multidetector computed tomography images", Proc. of SPIE, vol. 6143, 2006, pp. 614308-1-614308-12.

D. Vukadinovic, et al., "AdaBoost Classification for Model Based Segmentation of the Outer Wall of the Common Carotid Artery in CTA", Proc. of SPIE, vol. 6914, 2008, pp. 691418-1-691418-8.

David Lesage, et al., "Medial-Based Bayesian Tracking for Vascular Segmentation: Application to Coronary Arteries in 3D CT Angiography", IEEE International Symposium on Biomedical Imaging, ISBI, 2008, pp. 268-271.

David Lesage, et al., "Bayesian Maximal Paths for Coronary Artery Segmentation from 3D CT Angiograms", International Conference on Medical Image Computing and Computer-Assisted Intervention, MICCAI, vol. 12, 2009, pp. 222-229.

Michiel Schaap, et al., "Bayesian Tracking of Tubular Structures and Its Application to Carotid Arteries in CTA", Proceedings of International Conference on Medical Image Computing and Computer-Assisted Intervention, MICCAI, vol. 10, Jan. 2007, pp. 562-570.

Susanne Bock, et al., "Robust vessel segmentation", Proc. of SPIE, vol. 6915, 2008, pp. 691539-1-691539-9.

Reto D. Merges, et al., "Anatomical-based Segmentation with Stenosis Bridging and Gap Closing in Atherosclerotic Cardiac MSCT", Proc. of SPIE, vol. 6144, 2006, pp. 61440B-161440B-8.

Félix Renard, et al., "Image Analysis for Detection of Coronary Artery Soft Plaques in MDCT Images", 5th IEEE International Symposium on Biomedical Imaging, ISBI, 2008, pp. 25-28.

Yan Yang, et al., "Automatic Segmentation of Coronary Arteries Using Bayesian Driven Implicit Surfaces", IEEE International Symposium on Biomedical Imaging, ISBI, 2007, pp. 189-192.

J. Brieva, et al., "A Level Set Method for Vessel Segmentation in Coronary Angiography", Engineering in Medicine and Biology 27th Annual Conference, Sep. 1-4, 2005, pp. 6348-6351.

Shawn Lankton, et al., "Soft Plaque Detection and Automatic Vessel Segmentation", 5th International Symposium on Biomedical Imaging, ISBI, 2008, 9 pages.

Rashindra Manniesing, et al., "Local Speed Functions in Level Set Based Vessel Segmentation", Medical Image Computing and Computer-Assisted Intervention, MICCAI, 2004, pp. 475-482.

Delphine Nain, et al., "Vessel Segmentation Using a Shape Driven Flow", Medical Image Computing and Computer-Assisted Intervention, MICCAI, 2004, pp. 51-59.

Rachid Fahmi, et al., "Robust Segmentation of Tubular Structures in Medical Images", Proc. of SPIE, vol. 6914, 2008, pp. 691443-1-691443-7.

Wenli Cai, et al., "Vesselness propagation—A fast interactive vessel structure segmentation method", Proc. of SPIE, vol. 6144, 2006, pp. 614447-1-614447-9.

Yoshinobu Sato, et al., "Three-dimensional multi-scale line filter for segmentation and visualization of curvilinear structures in medical images", Medical Image Analysis, vol. 2, No. 2, Jun. 1998, pp. 143-168.

Dong Hye Ye, et al., "Fast multi-scale vessel enhancement filtering", Proc. of SPIE, vol. 6914, 2008, pp. 691423-1-691423-8.

Leonardo Flórez-Valencia, et al., "Segmentation and Quantification of Blood Vessels in 3D Images Using a Right Generalized Cylinder State Model", International Conference on Image Processing, ICIP, Oct. 2006, pp. 2441-2444.

Yan Xu, et al., "Quantification of Stenosis in Coronary Artery via CTA Using Fuzzy Distance Transform", Proc. of SPIE, vol. 7262, 2009, pp. 72620K-1-72620K-12.

Matthias Teßmann, et al., "Robust Automatic Calcium Scoring for CT Coronary Angiography", Computer Science, vol. 574, 2010, pp. 1-5.

(56) References Cited

OTHER PUBLICATIONS

Harvey E. Cline, et al., "Automated Coronary CT Angiography Plaque-Lumen Segmentation", Proc. of SPIE, vol. 7260, 2009, pp. 726003-1-726003-10.

Fei Zhao, et al., "Adaptive Intensity Models for Probabilistic Tracking of 3D Vasculature", IEEE International Symposium on Biomedical Imaging, ISBI, Apr. 2010, pp. 41-44.

Silvia D. Olabarriaga, et al., "Multi-scale Statistical Grey Value Modelling for Thrombus Segmentation from CTA", Proceedings of MICCAI, 2004, pp. 467-474.

Stefan Wörz, et al., "A New 3D Parametric Intensity Model for Accurate Segmentation and Quantification of Human Vessels", Proceedings of MICCAI, 2004, pp. 491-499.

Olivier Salvado, et al., "A new anisotropic diffusion method, application to partial volume effect reduction", Proc. of SPIE, vol. 6144, 2006, pp. 614464-1-614464-8.

Jamshid Dehmeshki, et al., "Volumetric Quantification of Atherosclerotic Plaque in CT Considering Partial volume Effect", IEEE Transactions on Medical Imaging, vol. 26, No. 3, Mar. 2007, pp. 273-282.

Mandi Mazinani, et al., "Automatic Segmentation of Soft Plaque by Modeling the Partial volume Problem in the Coronary Artery", Fourth International Conference on Digital Society, Feb. 2010, pp. 274-278.

J. MacQueen, "Some Methods for Classification and Analysis of Multivariate Observations", Proceedings of the Fifth Symposium on Math, Statistics and Probability, 1967, pp. 281-297.

Jose L. Marroquin, et al., "Some Extensions of the K-Means Algorithm for Image Segmentation and Pattern Classification", Massachusetts Institute of Technology Artificial Intelligence Laboratory, Al Memo 1390, Jan. 1993, 23 pages.

Todd K. Moon, "The Expectation-Maximization Algorithm", IEEE Signal Processing Magazine, vol. 13, Nov. 1996, pp. 47-60.

Brian Mohr, et al., "Accurate Lumen Segmentation and Stenosis Detection and Quantification in Coronary CTA", Proc. of MICCAI Workshop '3D Cardiovascular Imaging, A MICCAI Segmentation Challenge, 2012, 8 pages.

Yan Yang, et al., "Knowledge-Based 3D Segmentation and Reconstruction of Coronary Arteries Using CT Images", Proceedings of the 26$^{th}$ Annual International Conference of the IEEE EMBS, Sep. 1-5, 2004, pp. 1664-1666.

Marcela Hernández-Hoyos, et al., "Computer-assisted Analysis of Three-dimensional MR Angiograms", Radiographics, vol. 22, No. 2, Mar.-Apr. 2002, pp. 421-436.

Sharon a. Stansfield, "ANGY: A Rule-Based Expert System for Automatic Segmentation of Coronary Vessels From Digital Subtracted Angiograms", IEEE Transactions on Pattern Analysis and Machine Intelligence, vol. PAMI-8, No. 2, Mar. 1986, pp. 188-199.

\* cited by examiner

METHOD OF, AND APPARATUS FOR, SEGMENTATION OF STRUCTURES IN MEDICAL IMAGES

FIELD

Embodiments described herein relate generally to a method of, and apparatus for, segmentation of structures in medical images. Embodiments have, for example, application to segmentation of vessels in computed tomography image data.

BACKGROUND

In modern medical imaging techniques, it is desirable to automatically or semi-automatically identify structures that are represented in an image of a patient or other subject. The structures represented in an image may be anatomical, for example vessels or organs. The structures may also be artificial structures such as stents.

Segmentation may represent the process of identifying pixels or voxels representing a given structure in an image, which may include separating the pixels or voxels from the rest of the image. The identification and/or separation of pixels or voxels representing the structure facilitates further processing of information relating to the structure, for example, measurement of the structure, or rendering the structure in a way that is distinct from other structures in the image. In order to separate a structure from the rest of the image, it is necessary to know which pixels or voxels correspond to which tissue types (or types of artificial object). The image can then be divided into a part of the image that represents the tissue type corresponding to the structure, and a remainder that does not represent the tissue type. If there is more than one structure in the image of a given tissue type, further techniques may be used to separate discrete structures. Multiple structures may be segmented in one image.

The classification of voxels into particular tissue types can be difficult. The different tissue types appear in the image as voxels with different intensities, but the intensities for any given tissue type can vary due to a range of factors including differences in image acquisition hardware, anatomical variations in the patient, the presence of diseased regions, the medical protocol used when injecting the patient with any contrast dyes or agents, and attenuation caused by contrast dye.

Accurate segmentation of blood vessels may be required in order to identify diseased region of the vessels. For example, accurate segmentation of the vessel lumen and vessel wall may be required in order to perform stenosis measurements, for example in the coronary arteries. Stenosis is an abnormal constriction or narrowing of a vessel. The vessel wall comprises tissues and any plaque deposits which may be present. The lumen is a blood-filled space that is surrounded by the wall. If calcified plaque (calcification) is present in the vessel, it is advantageous to be able to remove calcification voxels from the data set as a preliminary stage in the image processing, to enable more accurate lumen/wall segmentation.

Automatic or semi-automatic vessel tracking algorithms may be used to track vessels within imaging data. It has been found that some vessel tracking algorithms may face difficulty or fail if large calcium deposits are present in the vessel that is being tracked. It has also been found that accurate vessel segmentation may be complicated by the presence of large calcium deposits.

The coronary arteries are often imaged by introducing a contrast agent into the coronary arteries, which increases the intensity of the vessel lumen as viewed in a computed tomography (CT) image, distinguishing the lumen from surrounding tissue. However, the contrasted lumen may become difficult to distinguish from calcifications which may also appear in the image as high intensity features.

Subtraction is a frequently-used method of improving or clarifying the effect of contrast in a contrast-enhanced scan. A non-contrast scan (also known as a non-enhanced or pre-contrast scan) and a contrast-enhanced scan are obtained for a given vessel or vessels. The intensities of the non-contrast scan are subtracted from the intensities of the contrast-enhanced scan at each corresponding voxel location in the two scan volumes to remove features that are common to the contrast and the non-contrast scan (including, for example, bone and soft tissue) and to leave only the parts of the contrast image that have been enhanced by the contrast agent.

Some form of alignment between the data from the non-contrast scan and the data from the contrast-enhanced scan is usually necessary to ensure that the voxel locations of the two scans correspond anatomically. Images may be aligned manually, also known as pixel shift. For example, a clinician may manually align contrast and pre-contrast images by overlaying the images and adjusting the position of one of the images relative to the other. Alternatively, the images may be aligned by mechanical alignment, for example in positron emission tomography-computed tomography (PET/CT) or multispectral CT. Modern systems may automatically align images using software and may apply linear or non-linear registration processes as appropriate.

Coronary computed tomography angiography (CCTA) is a method of imaging the coronary arteries. A non-contrast image is acquired when no contrast agent is present in the coronary arteries. A contrast image is acquired with a contrast agent present in the coronary arteries. The contrast agent enhances the intensity of the coronary arteries. Subtraction of the contrast and the non-contrast image is used to distinguish calcified plaque (calcifications) from the artery lumen. Subtraction may also be used to distinguish stents or any other similar high-intensity feature from the artery lumen. Bone is another high intensity feature that may be removed by subtraction.

Subtraction may also be used in applications other than those comparing contrast and non-contrast data. For example, subtraction may be used to compare images of perfusion.

One example of the effect of subtraction is illustrated in FIGS. 1(a), 1(b) and 1(c). FIG. 1(a) is a contrast (CCTA) image which includes a calcification 10 surrounding a vessel lumen 12. FIG. 1(b) shows a non-contrast image (for example, calcium score image) for the same vessel showing the same calcification 10. In the non-contrast image of FIG. 1(b) the lumen 12 may be difficult to distinguish from the background tissue because there is no enhancement of the lumen.

Calcifications, especially severe calcifications, may impede the ability of the clinician to assess the CCTA data directly. The lumen may be difficult to interpret in the presence of calcified plaque.

To remove the calcification 10 from the contrast image, the non-contrast image is subtracted from the contrast image by subtracting the intensities of the non-contrast data from the intensities of the contrast data at corresponding voxel locations in the two volumes.

FIG. 1(c) shows the subtraction image obtained by subtracting the image data corresponding to FIG. 1(b) from the image data corresponding to FIG. 1(a). In the subtraction image of FIG. 1(c), the lumen 12 may be seen more clearly than in the contrast image of FIG. 1(a) because the calcification 10 has been subtracted. Without the calcification 10, lumen 12 is easier to interpret, and the clinician can more easily estimate the lumen dimensions (for example, the lumen diameter) and the degree of stenosis.

Many automatic vessel segmentation techniques have previously been proposed. FIGS. 2(a) and 2(b) are representative of the results of a known coronary vessel segmentation method that has been performed on a contrast image. A large calcium deposit is present in the vessel to be segmented.

FIGS. 2(a) and 2(b) show two different views of a set of CCTA (contrasted) image data showing a coronary vessel. FIG. 2(a) shows a straightened vessel view along the vessel centerline. FIG. 2(b) shows a cross-section of the vessel taken perpendicular to the centerline. A large calcium deposit 20 can be seen in both views as an area of high intensity.

A lumen segmentation has been performed on the image data corresponding to FIGS. 2(a) and 2(b), using the known coronary vessel segmentation method. The bounds of the segmentation are shown in each of FIGS. 2(a) and 2(b) as a bold line 18.

The extent of the lumen was also assessed by a clinician using the same image data. The automatically segmented lumen boundary as shown with bold line 18 was found to be smaller than the lumen area that was assessed by the clinician. The size of the vessel lumen was underestimated in this known method of segmentation of the contrasted data set, due to the presence of the large calcium deposit 20.

Tracking and segmenting vessels in contrasted data may be difficult because of the similarity between the intensity of contrasted blood in the vessel lumen and the intensity of calcium. One possible solution may be to track and segment vessels in subtracted data instead of in contrast data. In subtracted data, calcifications or other similar high-intensity regions such as stents may be removed by the subtraction process, because they are common to the contrast data and the non-contrast data.

FIGS. 3(a) and 3(b) are representative of the results of the known coronary vessel segmentation process when performed on a subtraction image. The subtraction image of FIGS. 3(a) and 3(b) corresponds to the CCTA image of FIGS. 2(a) and 2(b). Therefore, again, a large calcium deposit is present.

FIGS. 3(a) and 3(b) show two views of a subtracted CT image of the vessel, on which the known lumen segmentation process has been performed. FIG. 3(a) shows a straightened vessel view along the vessel centerline. FIG. 3(b) shows a cross-section of the vessel taken perpendicular to the centerline. The subtraction process has subtracted the region of calcium 30.

The bounds of the lumen segmentation are shown as a bold line 18 in each of FIG. 3(a) and FIG. 3(b). The size of the lumen was also assessed by a clinician on the same subtraction image data.

In the subtraction image data corresponding to FIGS. 3(a) and 3(b), the known coronary vessel segmentation process overestimated the lumen when compared to the assessment by the clinician, and failed to find significant stenosis. The segmentation process estimated the degree of stenosis in the vessel as 4%. This vessel has an Agatston score of 192 (moderate calcium/risk) as calculated by software.

If automatic or semi-automatic vessel segmentation underestimates or overestimates the lumen then the results of the segmentation algorithm may not provide a benefit to the clinician. The clinician may not trust quantitative results, for example assessments of stenosis, that are provided by an image processing system that uses such a segmentation method.

BRIEF DESCRIPTION OF THE DRAWINGS

Embodiments are now described, by way of non-limiting example, and are illustrated in the following figures, in which:—

DETAILED DESCRIPTION

Certain embodiments provide an apparatus for segmentation of medical image data, comprising a data processing unit for receiving a first set of image data and a second set of image data, wherein at least one structure is represented in both the first set of image data and the second set of image data, a classification unit configured to determine a classification of a first type of feature from the first set of image data and to determine a classification of a second type of feature from the second set of image data, and a segmentation unit configured to segment the or each structure in dependence on both the classification of the first type of feature from the first set of image data and the classification of the second type of feature from the second set of image data. Segmenting a structure may mean identifying image data representing the structure.

Figure 4:
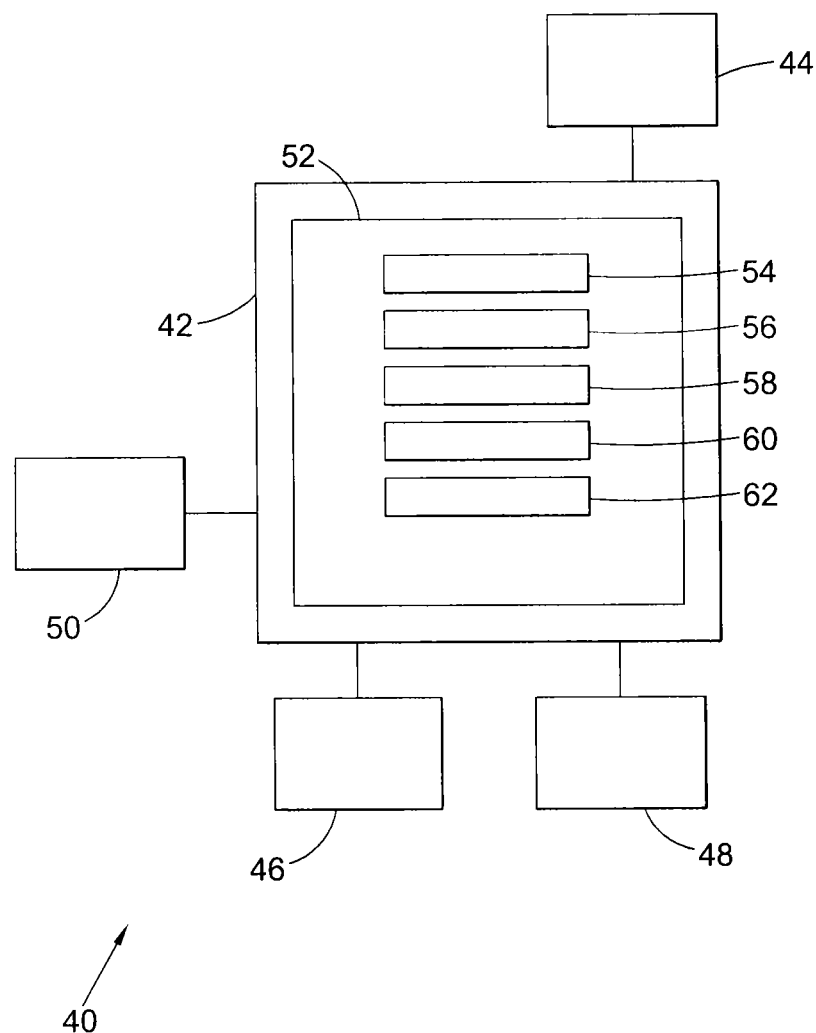
FIG. 4 is a schematic illustration of an apparatus according to an embodiment.

An apparatus 40 according to an embodiment is illustrated schematically in FIG. 4. The apparatus 40 comprises a computing apparatus 42, in this case a personal computer (PC) or workstation, that is connected to a CT scanner 44, one or more display screens 46 and an input device or devices 48, such as a computer keyboard, mouse or trackball. In the present embodiment, the CT scanner 44 is one of the Toshiba Aquilion® range of CT scanners. The CT scanner 44 may instead be any CT scanner that is configured to obtain three-dimensional image data. In alternative embodiments, the CT scanner 44 may be replaced or supplemented by a scanner in any other imaging modality, for example an MRI scanner, X-ray scanner or PET scanner.

In the present embodiment, sets of image data obtained by CT scanner 44 are stored in memory 50 and subsequently provided to computing apparatus 42. In an alternative embodiment, sets of image data are supplied from a remote data store (not shown) which may form part of a Picture Archiving and Communication System (PACS). The memory 50 or remote data store may comprise any suitable form of memory storage.

The computing apparatus 42 provides a processing resource for automatically or semi-automatically processing sets of image data. Computing apparatus 42 comprises a central processing unit (CPU) 52 that is operable to load and execute a variety of software modules or other software components that are configured to perform the method that is described below with reference to FIG. 5.

The computing apparatus 42 includes a data processing unit 54 for receiving medical images, a classification unit 56 for classifying voxels in medical image data, and a segmentation unit 58 for segmenting structures in medical image data.

In the present embodiment, the computing apparatus 42 also includes a registration unit 60 and a subtraction unit 62.

In the present embodiment, the data processing unit 54, classification unit 56, segmentation unit 58, registration unit 60 and subtraction unit 62 are each implemented in the computing apparatus 42 by means of a computer program having computer-readable instructions that are executable to perform the method of the embodiment. However, in other embodiments each unit may be implemented in software, hardware, or any suitable combination of hardware and software. In some embodiments, the various units may be implemented as one or more ASICs (application specific integrated circuits) or FPGAs (field programmable gate arrays). In further embodiments, one or more units may be implemented on a GPU (graphics processing unit).

The computing apparatus 42 also includes a hard drive and other components including RAM, ROM, a data bus, an operating system including various device drivers, and hardware devices including a graphics card. Such components are not shown in FIG. 4 for clarity.

Figure 5:
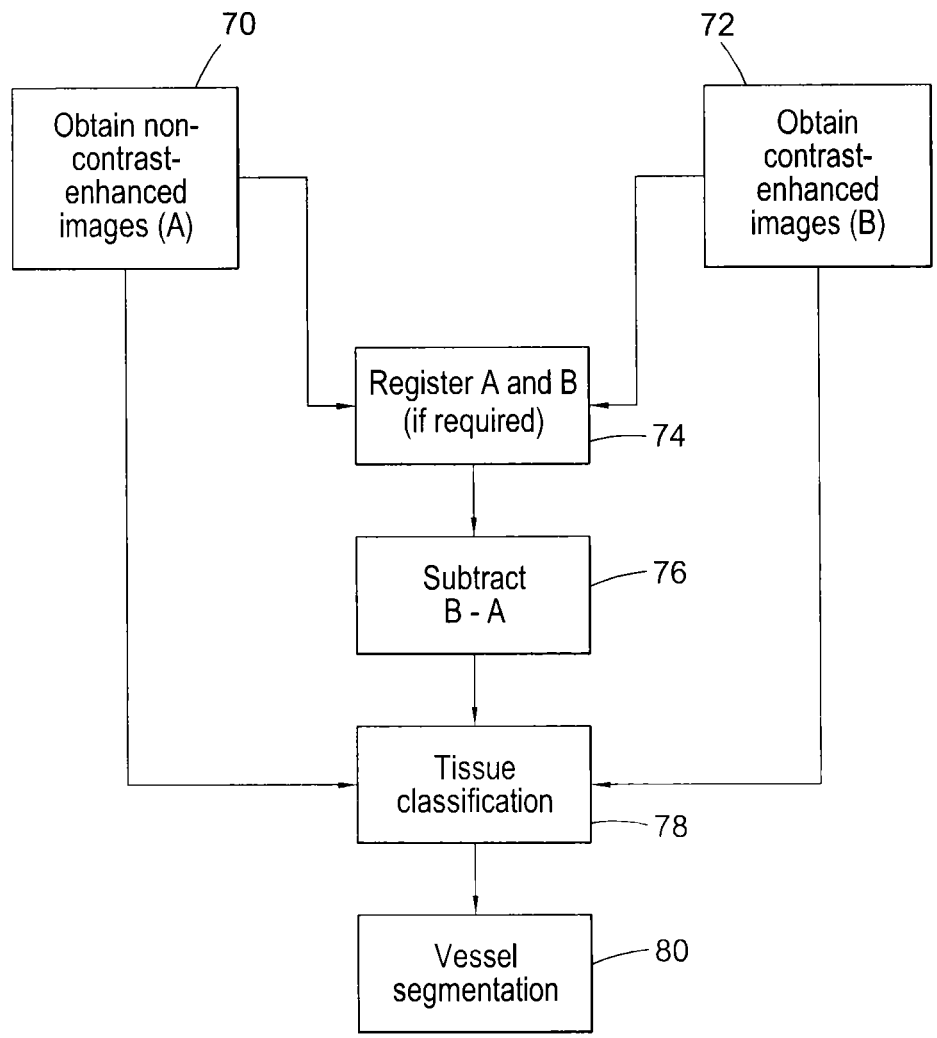
FIG. 5 is a flow chart illustrating in overview a process performed in accordance with an embodiment.

The system of FIG. 4 is configured to perform a process having a series of stages as illustrated in overview in the flow chart of FIG. 5. The process of FIG. 5 comprises a tissue classification and vessel segmentation that uses data from at least two of a non-contrast image, the corresponding contrast image, and a subtraction image obtained from subtracting the non-contrast and contrast images.

At stage 70, the data processing unit 54 obtains a set of non-contrast image data (referred to in the flowchart of FIG. 5 as A) from the memory store 50 or from a remote data store, or from the scanner 44 directly. The non-contrast image data comprises volumetric image data representing an image of a particular anatomical region of a patient, for example the torso or the head. In the present embodiment, the non-contrast image data is a calcium score scan of the coronary arteries of a patient.

In further embodiments, the data processing unit 54 may obtain any appropriate medical image data set at stage 70, which may not be non-contrast data. The anatomical region may be any appropriate anatomical region of a patient.

At stage 72, the data processing unit 54 obtains a set of contrast image data (referred to in the flowchart of FIG. 5 as B) from the memory store 50 or from a remote data store, or from the scanner 44 directly. The contrast image data comprises volumetric image data representing the same anatomical region of the same patient as was represented in the non-contrast image data obtained in stage 70.

In the present embodiment, the image data obtained in stage 72 is a set of contrast image data obtained from a CCTA scan of the coronary arteries of the patient which was taken as part of the same study as the non-contrast scan of stage 70. In further embodiments, contrast data may be acquired at stage 70 and non-contrast data at stage 72. In alternative embodiments, both sets of image data may be non-contrast data, or both may be contrast data. In other embodiments, any two sets of image data that are suitable for subtraction may be used.

At stage 74, the registration unit 60 automatically registers the non-contrast image data (A) with the contrast image data (B). Any suitable registration method may be used.

At stage 76, the subtraction unit 62 subtracts the registered non-contrast data set (A) from the contrast data set (B) to obtain a set of subtraction image data representing a subtraction image. In the present embodiment, the subtraction process comprises subtracting the intensity (CT number in HU) of each voxel of the non-contrast data set (A) from the intensity of the corresponding voxel in the contrast data set (B). The correspondence of the voxels is known from the registration process of stage 74.

In further embodiments, the non-contrast and contrast data sets may already be registered and/or subtracted when they are received at stages 70 and 72, in which case stage 74 and/or stage 76 may be omitted.

At stage 78, the classification unit 56 receives the non-contrast data set, the contrast data set and the subtraction data set from the data processing unit 54 or from any appropriate data store. The classification unit 56 then performs tissue classification of at least two tissue types that are present in the image data, using at least two of the data sets that it has received.

In the present embodiment, the classification unit 56 performs calcium classification on the non-contrast data set, and vessel lumen and vessel wall classification on the subtraction data set. The classification unit 56 determines likelihoods or probabilities that voxels in the data sets are calcium, lumen or vessel wall.

Any suitable tissue classification method may be used, and the tissue classification method may comprise either an unsupervised or a supervised classification method.

In further embodiments, the classification unit 56 classifies any type of feature, which may be a tissue type or a type of artificial object such as a stent.

It may be noted that in the present embodiment, the classification of the vessel lumen and of the vessel wall is performed on a different set of image data from the classification of the calcium. The classification of the vessel wall and vessel lumen is performed on the subtraction data set, while the classification of the calcium is performed on the non-contrast data set. Performing the classification of the vessel in the subtraction data means that the vessel lumen is easier to distinguish because of the presence of the contrast agent, and because calcium has been removed from the subtraction image by the subtraction process. In other embodiments, the classification of each type of feature may be performed on any one or more of the received data sets.

At stage 80, the segmentation unit 58 uses the classification of the types of features that has been obtained at stage 78 to segment each type of feature from one or more of the data sets. Any appropriate segmentation method may be used. In the present embodiment, at least one vessel is segmented from one or more of the data sets using the tissue classifications of stage 78. Using more than one data set (in the present embodiment, using at least two of the non-contrast data set, the contrast data set and the subtraction data set) to perform classification at stage 78 may provide improved classification of some tissue types compared with the case where a single data set (for example, the contrast data set) is used for the classification of all tissue types.

The improved classification may lead to improved segmentation. The segmentation of stage 80 may also use intensities from more than one of the image data sets, which may also improve the segmentation over a process that is performed on a single data set.

Figure 6:
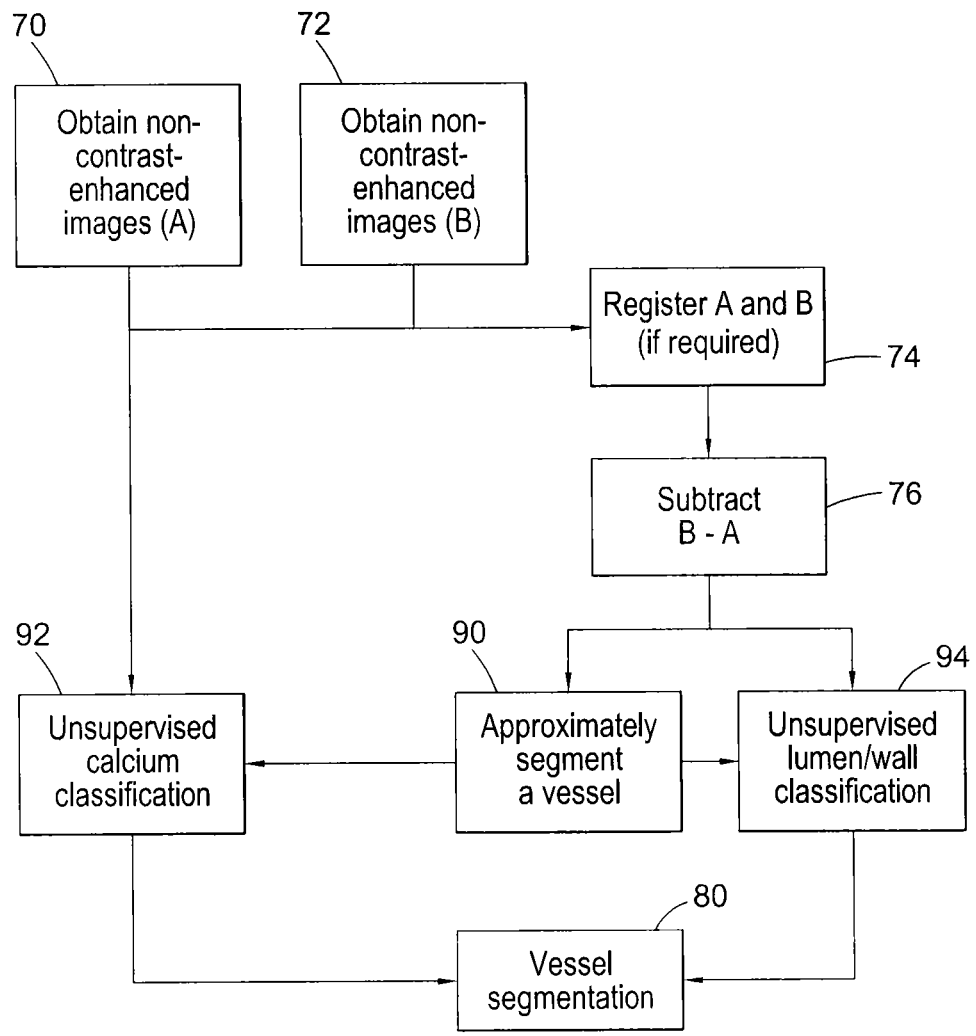
FIG. 6 is a flow chart illustrating in overview a process performed in accordance with an embodiment.

In a further embodiment, the system of FIG. 4 is configured to perform a process having a series of stages as illustrated in overview in the flow chart of FIG. 6.

At stage 70, the data processing unit 54 obtains a set of non-contrast image data from the memory store 50 or from a remote data store, or from the scanner 44 directly. In the embodiment of FIG. 6, the non-contrast image data is a calcium score scan of the coronary arteries of a patient.

In further embodiments, the data processing unit 54 may obtain any appropriate medical image data set at stage 70, which may not be non-contrast data. The anatomical region may be any appropriate anatomical region of a patient.

At stage 72, the data processing unit 54 obtains a set of contrast image data from the memory store 50 or from a remote data store, or from the scanner 44 directly. In the present embodiment, the image data obtained in stage 72 is a set of contrast image data obtained from a CCTA scan of the coronary arteries of the patient which was taken as part of the same study as the non-contrast scan of stage 70.

Since the non-contrast image data and contrast image data are required to be used together in the next stage of the process of FIG. 5, the non-contrast image data and the contrast image data may be taken at the same resolution. The resolutions are likely to be the same if the non-contrast data and the contrast data have been taken to be compatible for subtraction.

In further embodiments, contrast data may be acquired at stage 70 and non-contrast data at stage 72. In other embodiments, any two sets of image data that are suitable for subtraction may be used.

At stage 74, the registration unit 60 automatically registers the non-contrast image data (A) with the contrast image data (B). In the present embodiment, the registration unit performs a combination of non-rigid and rigid registration steps. The registration method used in the present embodiment is described in M Razeto, et al, 'Accurate registration of coronary arteries for volumetric CT digital subtraction angiography', International Conference on Graphic and Image Processing (Proc. of SPIE), vol 8768, pp 876834-1 to 876834-6, 2013. Accurate segmentation in later stages of the process of FIG. 6 may depend on accurate registration.

In the present embodiment, the registration unit 60 performs the registration process on all of the non-contrast image data and all of the contrast image data. In other embodiments, the registration unit 60 may perform a registration using only part of the non-contrast image data and/or part of the contrast image data.

In alternative embodiments, the non-contrast image data set (A) and the contrast image data set (B) are already registered to each other when they are received by the data processing unit 54, and stage 74 may be omitted. In such embodiments, the apparatus 40 may exclude the registration unit 60. In further embodiments, the non-contrast image data set and the contrast image data set may have been aligned by a method other than registration. For example, the non-contrast data set and the contrast data set may be mechanically aligned.

At stage 76, the subtraction unit 62 subtracts the non-contrast data set (A) from the contrast data set (B) to obtain a set of subtraction image data representing a subtraction image. In the present embodiment, the subtraction process comprises subtracting the intensity (CT number in HU) of each voxel of the non-contrast data set (A) from the intensity of the corresponding voxel in the contrast data set (B). The correspondence of the voxels is known from the registration process of stage 74. In further embodiments, either of the image data sets received in stages 70 and 72 may be subtracted from the other. In the present embodiment. the subtraction unit 62 performs the subtraction process using all of the data from the contrast image data and all of the data from the non-contrast image data. In other embodiments, the subtraction unit 62 may perform a subtraction of only part of the non-contrast image data and/or part of the contrast image data.

In alternative embodiments, the sets of image data have been subtracted before they are supplied to the data processing unit 54 at stages 70 and 72. In such embodiments, the set of image data for the subtraction image may be supplied to the data processing unit 54 at stage 72 in addition to the contrast image data, or instead of the contrast image data. Stage 76 may be omitted. In such embodiments, the apparatus 40 may not include the subtraction unit 62.

At stage 90, the segmentation unit 58 receives the set of subtraction image data that has been produced in stage 76 and approximately segments a blood vessel from the subtraction image data using any appropriate segmentation method. In further embodiments, the blood vessel may be approximately segmented from the contrast data or from the non-contrast data. In the present embodiment, the voxels of the blood vessel are roughly segmented from the subtraction data set using an efficient active contour algorithm. The final results of the process of FIG. 6 do not depend strongly on the initial approximate segmentation, so any desired approximate segmentation technique may be used. The approximate segmentation technique may include a vessel tracking method, which may be any appropriate method of vessel tracking.

The approximate segmentation results in an estimate of which voxels are part of the vessel. The estimation may not be accurate and may include some soft tissue surrounding the vessel.

Performing an approximate segmentation may improve the execution of later stages of the process of FIG. 6 by reducing the size of the data set on which further operations are performed. The approximate segmentation may remove anatomical features such as bone that are not of interest in the segmentation process of FIG. 6 from the data set on which further operations are performed.

In further embodiments, no approximate segmentation is performed and the process proceeds directly from the subtraction of stage 76 to stages 92 and 94.

Stages 92 and 94 each comprise a tissue classification. In the present embodiment, stage 92 comprises a calcium classification and stage 94 comprises a vessel lumen and vessel wall classification. In the present embodiment, stage 92 and stage 94 take place in parallel. However, in other embodiments, stage 92 may be performed before stage 94, or stage 94 may be performed before stage 92.

Stage 92 and stage 94 will be described with reference to the flow charts of FIG. 7 (for the calcium classification of stage 92) and FIG. 8 (for the vessel lumen and vessel wall classification of stage 94).

At stage 92 of the present embodiment, the classification unit 56 performs a calcium classification in the non-contrast image data using an unsupervised classification method. In alternative embodiments, any classification method may be used, whether supervised or unsupervised.

Figure 7:
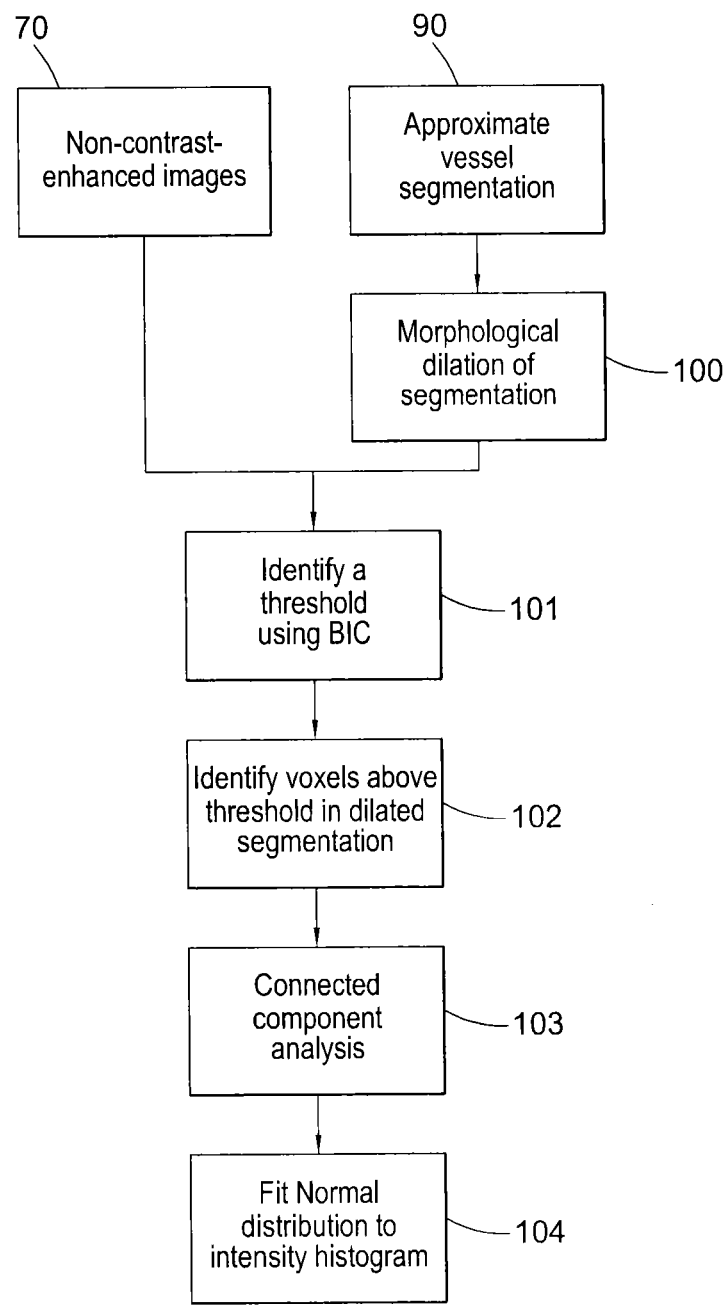
FIG. 7 is a flow chart illustrating in overview a process of unsupervised calcium classification in accordance with an embodiment.

The calcium classification method of the present embodiment is shown in the flow chart of FIG. 7. FIG. 7 starts with input from the non-contrast image set acquired at stage 70, and the approximate segmentation of stage 90.

At stage 100 of FIG. 7, the classification unit 56 identifies the part of the non-contrast image data set that corresponds to the part of the subtraction data set that was identified by the approximate segmentation of stage 90. This identification is possible because the non-contrast data set and subtraction data set are registered to each other, so the images are in the same coordinate space after registration.

The classification unit 56 applies a morphological dilation to the approximate segmentation. In the present embodiment, the approximate segmentation is dilated by a factor of 2. The classification unit 56 identifies the subset of the voxels of the set of non-contrast image data that corresponds to the dilated approximate segmentation. This subset of voxels in the non-contrast data set is the subset of voxels that will be used to perform the calcium classification.

At stage 101, the classification unit 56 determines an intensity threshold which is used to divide calcium voxels from non-calcium voxels. In the present embodiment, the threshold is found by deciding between different candidate thresholds using a Bayesian Information Criterion (BIC) technique as described below.

However, in other embodiments, any suitable method of determining a threshold between calcium voxels and non-calcium voxels may be used. In some embodiments, a different form of information criterion is used, for example an Akaike information criterion (AIC).

Other embodiments include embodiments in which the threshold is determined by a user. The user may select a threshold value through a user interface. For example, the user may select from a list of candidate threshold values, or may type in a threshold value.

Many embodiments are available that do not include a threshold determination stage 101. In such embodiments, a pre-determined intensity threshold may be used. For example, a pre-determined threshold may be programmed into the classification unit 56. It is possible for the process of FIG. 7 to proceed directly from stage 100 to stage 102 omitting stage 101 as long as some intensity threshold is available as an input to stage 102.

Turning to the threshold determination of the present embodiment, the classification unit 56 first identifies the maximum value and minimum value of voxel intensity in the subset of voxels of the non-contrast data set that were determined at stage 100.

The classification unit 56 then determines a set of candidate threshold values by setting the maximum intensity value as a first candidate threshold value, and repeatedly subtracting a fixed, pre-set interval from the first candidate threshold value to generate further threshold values, until the candidate threshold value drops below the minimum intensity.

The classification unit 56 defines a finite set of models, each using a different one of the set of candidate intensity thresholds. Each model comprises the subset of non-contrast image data determined in stage 100, partitioned by a candidate intensity threshold to create a first partition of voxels above the candidate intensity threshold and a second partition of voxels below the candidate intensity threshold.

The classification unit 56 then applies a likelihood or information criterion to each of the models to allow identification of the model giving the best fit, namely the model in which the threshold best divides the calcium voxels from the other voxels.

A suitable distribution is fitted to the data in each of the two partitions, for example a Gaussian distribution. The aim is to find the best separating threshold between the two distributions, as this will correspond to the boundary between the calcium and the non-calcium tissue. Non-calcium tissue comprises soft tissue, including non-enhanced vessels.

For each model, the classification unit 56 calculates the BIC on the two partitions or subgroups as a function of the threshold. The classification unit 56 thereby obtains a BIC measure for each of the finite set of models.

The classification unit 56 then generates a graph of BIC measure against threshold value, selects the model that corresponds to the first maximum of the BIC measure graph, and sets the candidate threshold value for that model as the calcium threshold that will be used in the calcium classification.

In the embodiment of FIG. 7, a different calcium threshold is used for each of the vessels in the non-contrast image data set. This allows for background variations in intensity through the data set, and any local fluctuations or artifacts. In other embodiments, the same threshold may be applied across the data set.

At stage 102, the classification unit 56 applies the calcium threshold to the subset of the non-contrast image data and identifies the voxels in the dilated approximate segmentation that are above the calcium threshold. The classification unit 56 may flag or otherwise mark the identified voxels as calcium voxels. In the present embodiment, the classification unit 56 defines a set of voxels that have been identified as calcium.

At stage 103, the classification unit 56 uses connected component analysis to identify individual calcium deposits. The set of voxels that have been identified as calcium will comprise a set of regions, each comprising a plurality of connected voxels. A connected component analysis process is applied to the voxels that have been identified as representing calcium. The connected component analysis identifies each of the clusters of inter-connected voxels as separate regions. Any suitable known connected component analysis process may be used to identify the regions of connected voxels.

A voxel may be considered to be connected to another voxel if it is adjacent to that other voxel. In some embodiments, adjacent voxels may be only those voxels whose faces are adjacent (in which case a particular voxel may be adjacent to a maximum of 6 other voxels). In other embodiments, adjacent voxels may be only those voxels whose faces or edges are adjacent (in which case particular voxel may be adjacent to a maximum of 18 other voxels). In still other embodiments, adjacent voxels may be those voxels whose faces, edges or corner points are adjacent (in which case a particular voxel may be adjacent to a maximum of 26 other voxels). It will be understood that an adjacent voxel may be adjacent to one or more further voxels, and thus a connected region may be of any shape or size up to the maximum size of the data set in question, here the set of voxels that have been identified as calcium.

The connected component analysis results in an identified set of discrete calcium regions within the subset of the non-contrast image that was identified at stage 78.

At stage 104, the classification unit 56 fits the intensity distribution for each calcium region to a Gaussian using k-means and/or Expectation-Maximization (EM). The k-means algorithm is described by J B McQueen in "Some methods for classification and analysis of multivariate observations" (*Proceedings of the Fifth Symposium on Math, Statistics, and Probability*, pages 281-297, University of California Press, 1967) and by J Marroquin and F Girosi in "Some extension of the k-means algorithm for image segmentation and pattern recognition" (*AI Memo* 1390, Massachusetts Institute of Technology, Cambridge, Mass., 1993). The expectation-maximization (EM) algorithm is described by TK Moon in "The expectation-maximization algorithm" (*Signal Processing Magazine*, IEEE, vol. 13, pages 47-60, November 1996).

In further embodiments, any suitable fitting function may be used. In other embodiments, each intensity distribution is fitted to an alternative distribution rather than to a Gaussian.

The classification unit 56 defines for each voxel in the subset of non-contrast data a likelihood that the voxel represents calcium, based on the fitted distributions. This concludes the calcium classification of FIG. 7. The output of the calcium classification of FIG. 7 is a set of calcium likelihoods.

Turning again to FIG. 6, the calcium classification of stage 92 has been described with reference to FIG. 7, and has resulted in a set of calcium likelihoods.

In the present embodiment, stage 94 of FIG. 6 takes place at the same time at stage 92. At stage 94, the classification unit 56 performs a classification of the vessel, which may comprise a classification of the vessel lumen, classification of the vessel wall, or plaque characterization. In the present embodiment, an unsupervised classification method is used. In other embodiments, a supervised classification method may be used.

Figure 8:
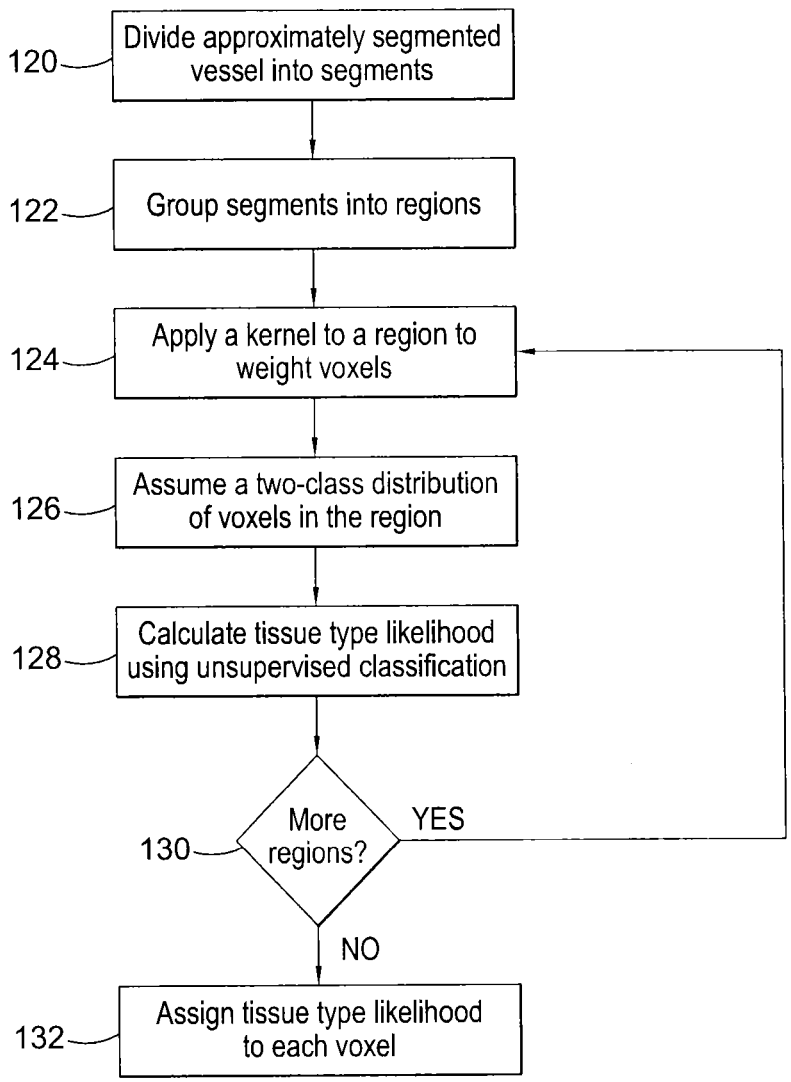
FIG. 8 is a flow chart illustrating in overview a process of unsupervised lumen classification in accordance with an embodiment.
Figure 9:
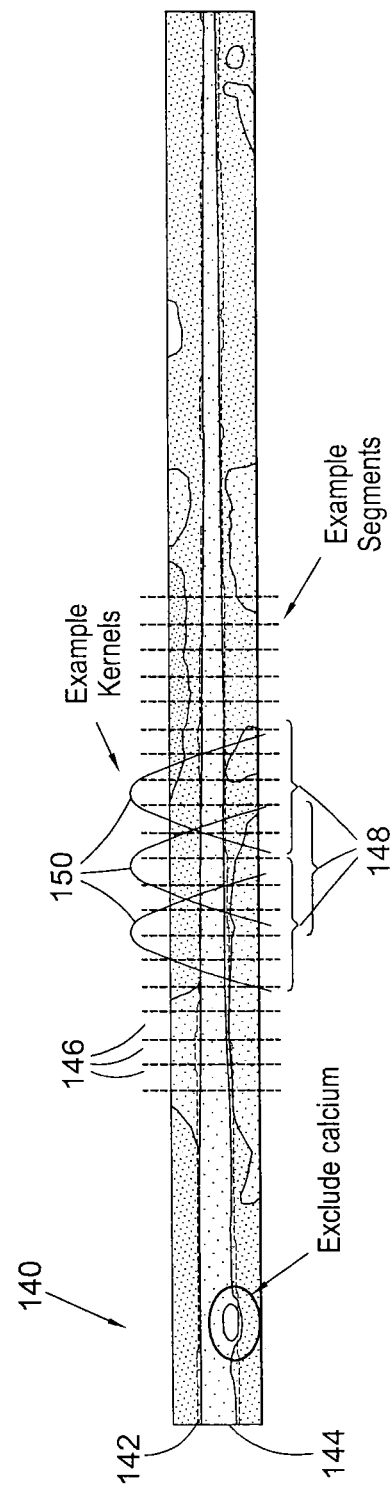
FIG. 9 shows a schematic representation of an imaged blood vessel to which a classification process has been applied.
Figure 10A:
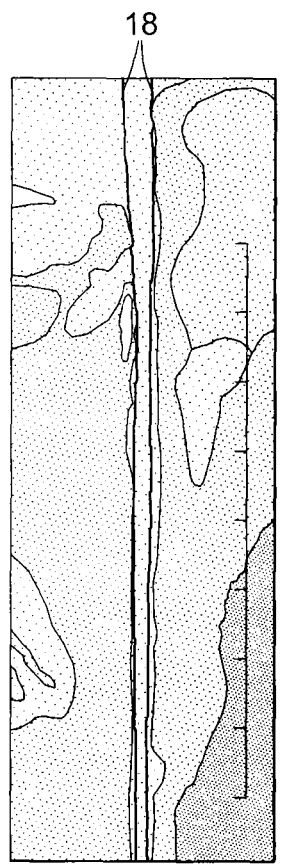
FIGS. 10(a) and 10(b) shows the results of a lumen segmentation in accordance with the process of FIG. 6.
Figure 10B:
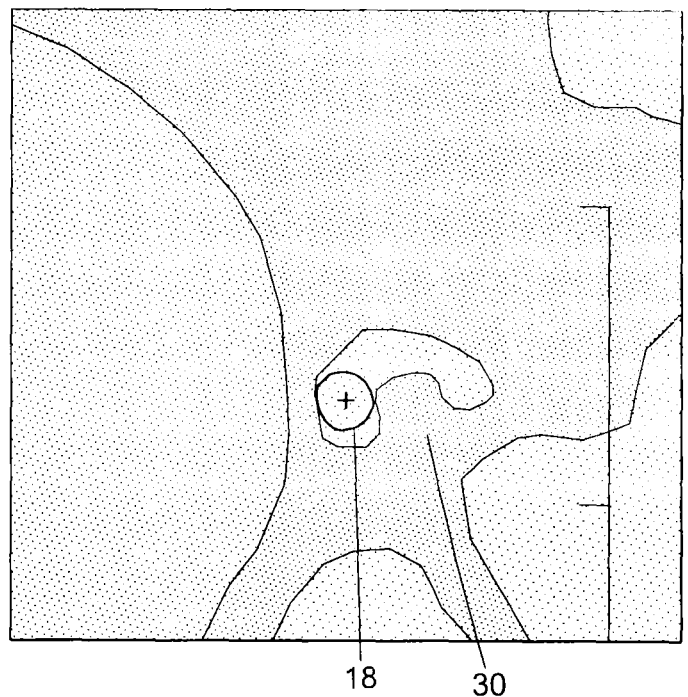

The vessel lumen and vessel wall classification of the present embodiment is shown in the flow chart of FIG. 8. Beginning at stage 120 of FIG. 8, the classification unit 56 uses the approximate segmentation that was performed at stage 90 of FIG. 6. The classification unit 56 divides the vessel as represented by the subset of voxels that was determined in the approximate segmentation into a plurality of sections along the length of the vessel. FIG. 9 shows a schematic cross-section through part of an imaged blood vessel 140, comprising a vessel wall 142 and a vessel lumen 144. The vessel has been divided into a plurality of adjacent sections 146, indicated by the dotted lines.

At stage 122 of FIG. 8, the classification unit 56 groups adjacent sections together into regions, which in FIG. 9 each comprise five sections, having a small overlap between sections. At stage 124, the classification unit 56 applies a Gaussian kernel 150 to a region, thus producing a set of weighted voxel values.

At stage 126, the classification unit 56 performs a probability classification of the voxels in the region using a Gaussian Mixture Model. At stage 128, an unsupervised classification algorithm is applied to the distribution to calculate a likelihood, or probability, that a voxel with a given intensity corresponds to a particular tissue type, such as the wall or the lumen. Hence, a likelihood of each tissue type can be allocated to each voxel in the region.

Any known technique can be used for the classification algorithm, which will estimate the mean, variance and weight of each of the two distributions in the two-class distribution in order to arrive at the likelihood (or probability) for each intensity. For example, the k-means algorithm or the EM algorithm may be used. The EM algorithm could be used in conjunction with the k-means algorithm.

At stage 130, the classification unit 56 checks for more regions. If there are regions on which no probability calculation has yet been performed, the method repeats stage 124, stage 126 and stage 128 until all regions have been processed.

At stage 132, the classification unit 56 assigns tissue type or class likelihoods (or probabilities) to each voxel, according to the likelihoods (or probabilities) calculated in stage 128. In the present embodiment, the classification unit 56 defines for each voxel in the subset of the subtracted data a likelihood that the voxel represents lumen and a likelihood that the voxel represents vessel wall, according to the likelihoods of stage 128.

This concludes the vessel lumen and vessel wall classification of FIG. 8. The output of the vessel lumen and vessel wall classification of FIG. 8 is a set of vessel lumen likelihoods and a set of vessel wall likelihoods.

Turning back to FIG. 6, stages 92 and 94 (calcium and lumen/wall classification) have now been completed and the classification unit 56 has obtained calcium likelihoods, vessel lumen likelihoods, and vessel wall likelihoods for voxels in the image data.

In alternative embodiments, any suitable vessel lumen and vessel wall classification process may be used, for example any suitable unsupervised vessel lumen and vessel wall classification process.

Using unsupervised methods for calcium classification and for vessel lumen and wall classification may mean that the methods do not require any training and are each able to correctly operate upon a single isolated data set without reference to any other data set. Alternatively, unsupervised methods may be used across multiple data sets. For example, an unsupervised method may be applied to a non-contrast data set and a subtraction data set that relate to the same vessel.

In other embodiments, the classification unit 56 classifies one or more types of feature from one or more of the contrast data set, the non-contrast data set and the subtraction data set using a supervised learning method. In such embodiments, the supervised learning method may be trained on previously-obtained image data in which tissue has previously been classified, for example by a clinician.

In the embodiment of FIG. 6, the tissue classification comprises a calcium classification using the non-contrast data set and a vessel wall and vessel lumen classification using the subtraction data set. It may be said that in the present embodiment, the classification unit 56 performs a classification of a first type of feature from a first set of image data and a classification of a second type of feature from a second set of image data. In the present embodiment, the first type of feature comprises calcium, the first set of image data comprises the non-contrast data set, the second type of feature comprises vessel lumen (or vessel wall) and the second set of image data comprises the subtraction data set. In other embodiments, the first set of image data may comprise the contrast data set or the subtraction data set, and the second set of image data may comprise the non-contrast data set or the contrast data set. In alternative embodiments, each type of feature may be any appropriate tissue type or type of artificial structure (for example, a stent).

Returning to the flow chart of FIG. 6, stages 92 and 94 have been completed and the classification unit 56 has determined likelihoods that voxels are calcium, vessel wall or vessel lumen. The process of FIG. 6 then proceeds to stage 80, which makes use of the determined likelihoods to segment at least one vessel from at least one of the data sets.

At stage 80, the segmentation unit 58 receives from the classification unit 56 the likelihoods or probabilities for calcium and for lumen and wall that were obtained in stages 92 and 94 in association with each voxel. In the present embodiment, the segmentation unit 58 receives calcium likelihoods that were obtained from the subset of the non-contrast data in stage 80 (comprising stages 90 to 104), and vessel lumen and vessel wall likelihoods that were obtained from the subset of the subtraction data in stage 82 (comprising stages 110 to 122).

Once voxels have been assigned likelihoods or probabilities, it is possible to use those likelihoods or probabilities to segment voxels of each particular type from a data set that comprises intensity data. In the present embodiment, the data set from which voxels of each type are segmented is a combined data set which incorporates image data from both subtraction and pre-contrast data. In the present embodiment, the combined data set comprises, for each voxel, intensity data from the non-contrast data set and intensity data from the subtraction data set.

In the present embodiment, the data set from which voxels are segmented comprises all of the intensities from the non-contrast image data set and the subtraction data set. The segmentation uses data from the whole data set and is not limited to the approximate segmentation. In other embodiments, the data set from which voxels are segmented comprises only the subset that was approximately segmented at stage 90 of FIG. 6, or any other appropriate subset.

In alternative embodiments, voxels of each type are segmented from the non-contrast data set, the contrast data set, the subtracted data set, a combination of any of the non-contrast data set, the contrast data set and the subtracted data set, or a subset of any of the non-contrast data set, the contrast data set and the subtracted data set.

In other embodiments, the combined data set comprises intensities from at least one of the non-contrast data set, the contrast data set and the subtracted data set, plus likelihoods obtained from stage 92 and stage 94 of FIG. 6.

The likelihoods that have been determined in stage 92 and 94 may be applied to any of the data sets because all of the data sets are aligned in a common coordinate system. For example, a calcium classification likelihood that is obtained for voxels of the non-contrast data set in stage 92 may subsequently be applied to the contrast data set or the subtraction data set.

In the present embodiment, the segmentation unit 58 performs a segmentation of the lumen from the combined data set using the data obtained from the unsupervised calcium classification of stage 92 and the unsupervised lumen and wall classification of stage 94.

In the present embodiment, segmentation of the lumen is performed using a level-set approach. A level-set technique for segmentation of the lumen is described in Mohr B, Masood S, Plakas C, 2012, 'Accurate lumen segmentation and stenosis detection and quantification in coronary CTA', Proc. of MICCAI Workshop '3D Cardiovascular Imaging: a MICCAI Segmentation Challenge'. Vessel tissue classification and calcium classification probabilities are used to weight a speed function driving a level-set. The speed function uses the likelihoods of being in one of the three classes for which likelihoods have been determined (calcium, vessel lumen, vessel wall). The level-set is solved to achieve a segmentation.

The level-set process assigns each individual voxel to a tissue type. The segmentation unit 58 extracts those voxels that are assigned to vessel lumen.

In alternative embodiments, any appropriate segmentation method may be used in stage 80, for example an active contour method.

In further embodiments, segmentation of the vessel wall may also be performed. Any suitable segmentation method may be used. In one method, the vessel, as represented by a set of classified vessel voxels, is divided into a plurality of sections along its length. For each section, a generally tubular geometrical shape is defined, the shape intended to roughly model the outer surface of the vessel wall. The defined tubular shape is taken to represent a 3D energy or cost function. Each tubular shape is fitted by minimizing the energy function. The minimized energy functions for each section of the vessel are connected to allow the fitted tubular shape to be aligned or joined together, for example by applying constraints. The fitted tubular shape is then used to segment the voxels of the vessel wall from the remaining voxels.

In the present embodiment, stage 80 describes the segmentation of a single vessel. In alternative embodiments, stage 80 is repeated for further vessels in the image data. In further embodiments, multiple vessels are processed simultaneously at some or all of the stages of the process of FIG. 6.

Although in the present embodiment, the classification of the first type of feature in the first set of image data is performed using the method of FIG. 7 and the classification of the second type of feature in the second set of image data is performed using the method of FIG. 8, in other embodiments the classification of the second type of feature may be performed using the method of FIG. 7 and the classification of the first type of feature may be performed using the method of FIG. 8. In alternative embodiments, both classifications may be performed using the method of FIG. 7, or both classifications may be performed using the method of FIG. 8. In further embodiments, any appropriate classification method may be used for either stage, which may be the same method for both classifications, or a different method for each classification.

In the method described above with reference to FIG. 6, both (registered) non-contrast data (also known as pre-contrast data) and subtraction data are used when segmenting vessels. The presence of calcium in the subtraction data is inferred from the pre-contrast data and the segmentation is appropriately modified to take into account the information on the calcium.

It is believed that pre-contrast data is more appropriate for the calcium classification step than contrast-enhanced data as the effects of calcium blooming may be less significant. Calcium blooming is a type of image artifact which makes a region of calcification look larger than its true physical extent. Calcium blooming may be due to a combination of artifacts such as beam hardening and motion. It is known that calcium blooming may be more significant in CCTA images than in non-contrast images. Also, it may be much easier to identify calcium in the pre-contrast image data than in the contrast image data or subtraction image data due to the absence of contrast. Nonetheless, alternative embodiments may use contrast data for the calcium classification step.

It may be much easier to identify and classify vessel lumen in the subtraction data than it would be to identify and classify vessel lumen in the pre-contrast or contrast image data, due to the absence of calcium in the subtraction data and the contrast enhancement that is present in the subtraction data but not in the pre-contrast data.

The method of FIG. 6 may provide the benefits of using subtraction without losing information regarding the calcium, which may otherwise be lost if performing a segmentation based only on image data in which the calcium has been removed by subtraction.

The method of FIG. 6 may make the quantitative result of automated segmentation more reliable and accurate, so that a measure of stenosis that is provided by a system that uses automated segmentation of vessels may be more trusted by the clinician. At present, while the state of the art is having an imaging system quantify the degree of stenosis, the clinician may use the system's result only as a guide and still make a diagnosis using his or her own assessment of the image rather than the quantitative results provided by the system. The method of FIG. 6 may result in the clinician being more prepared to use quantitative results that are provided by the system.

Previous known methods of segmentation which are performed on subtraction data alone may tend to overestimate the lumen and underestimate stenosis. Previous known methods of segmentation when performed on contrasted (CCTA) data alone may tend to underestimate the lumen. The method of FIG. 6 uses both non-contrast image data (calcium score data) and subtraction image data to achieve a good estimate of the lumen size and degree of stenosis.

Alternative embodiments may make use of the contrast (CCTA) data that corresponds to the non-contrast and subtraction data. Such embodiments may obtain likelihoods of at least one type of feature from the contrast data, and combine these likelihoods with the likelihoods obtained from the calcium classification and lumen/wall classification described in the method of FIG. 6.

The lumen segmentation technique of FIG. 6 benefits from using more information than is present in subtraction data alone. It is expected that using calcium classification in pre-contrast data may resolve any difficulty due to artifacts (for example, dark spots or rings) in the subtraction data, and provide a significantly improved estimate of the vessel wall compared to segmentation methods that are only based on subtraction data.

Figures 1A, 1B, 1C:
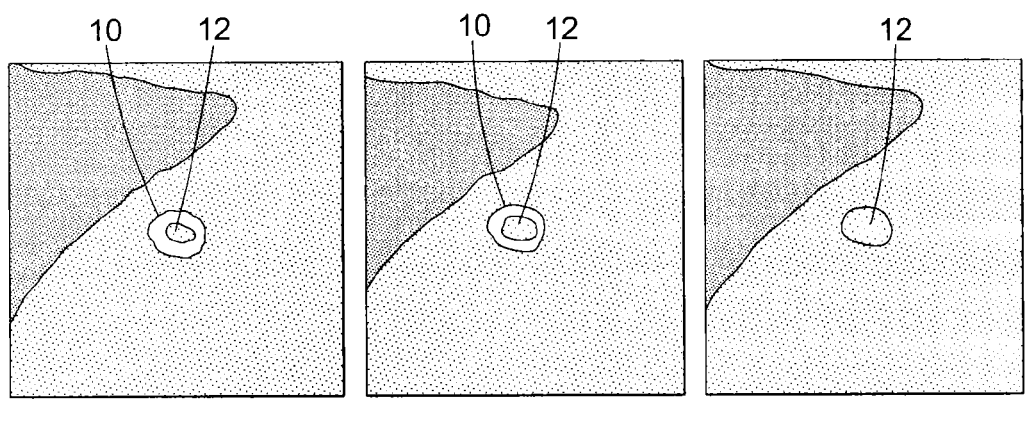
FIGS. 1(a), 1(b) and 1(c) represent a contrast-enhanced image, a non-contrast image and a subtraction image respectively.
Figure 2A:
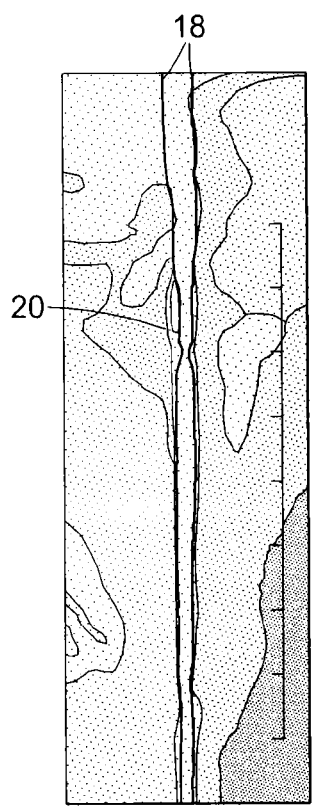
FIGS. 2(a) and 2(b) show the results of an exemplary known vessel segmentation in CCTA (contrasted) image data.
Figure 2B:
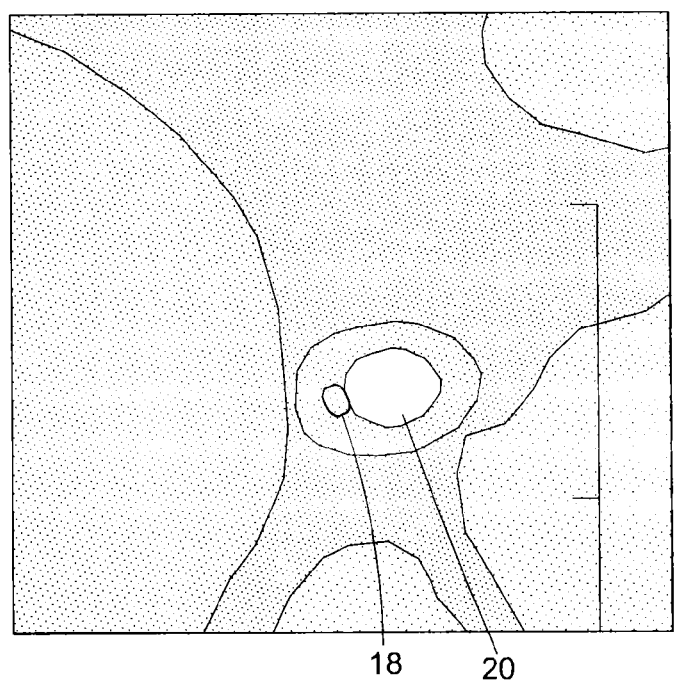
Figure 3A:
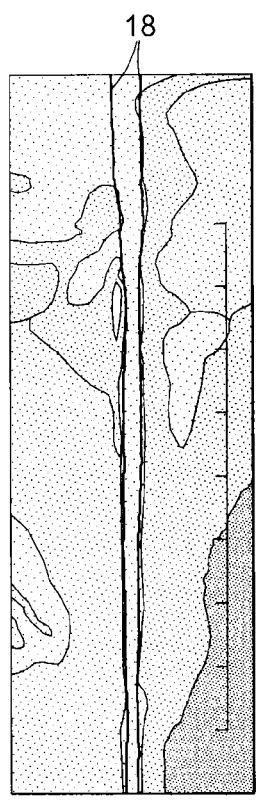
FIGS. 3(a) and 3(b) show the results of an exemplary known vessel segmentation in subtraction image data.
Figure 3B:
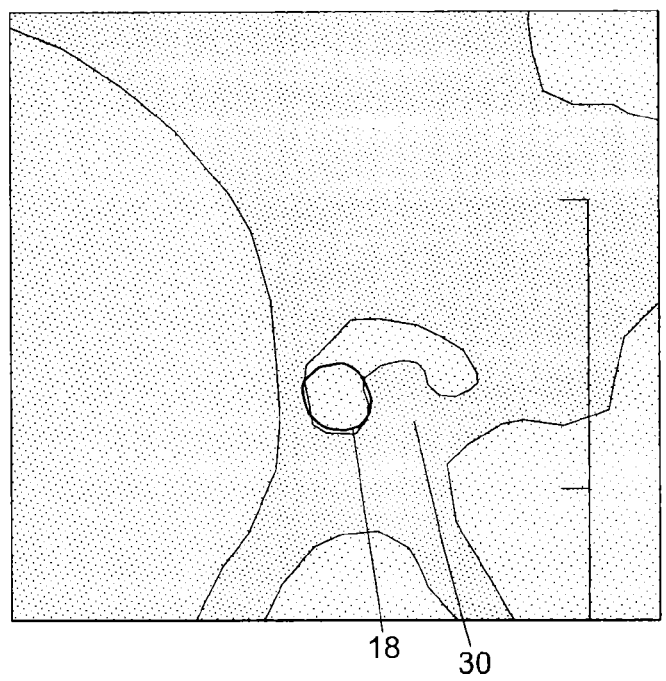

FIGS. 10(a), 10(b), 11(a) and 11(b) show the results of a test in which the subtraction data for which images are shown in FIGS. 3(a) and 3(b) was segmented by applying the method of FIG. 6 to the subtraction data set of FIGS. 3(a) and 3(b) and its corresponding non-contrast data set.

Figure 11A:
FIGS. 11(a) and 11(b) show the results of a lumen segmentation in accordance with the process of FIG. 6, overlaid with the results of the known vessel segmentation method that is illustrated in FIGS. 3(a) and 3(b)
Figure 11B:
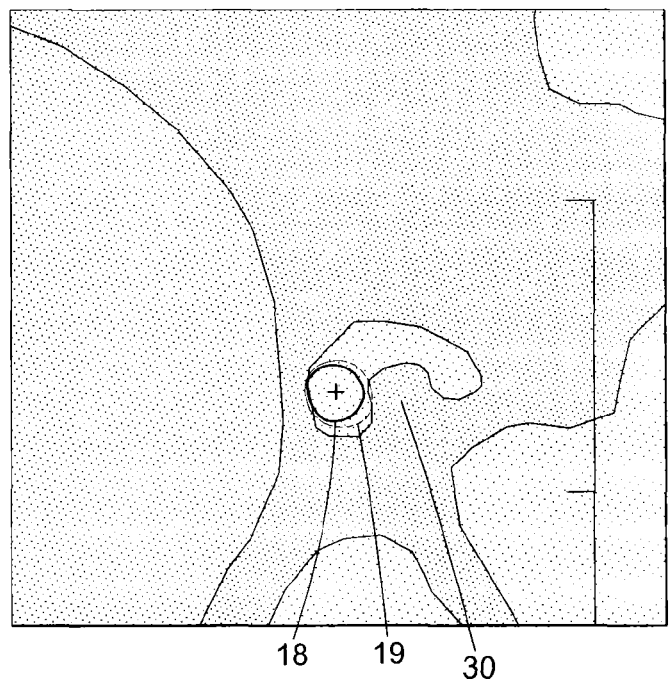

In FIGS. 10(a), 10(b), 11(a) and 11(b), bold lines 18 mark the bounds of the segmentation of the vessel lumen that was performed using the method of FIG. 6. In FIGS. 11(a) and 11(b) a set of dashed lines 19 are also present, marking the bounds of the segmentation of the lumen that was shown in FIGS. 3(a) and 3(b), in which the segmentation was performed on the subtraction data alone. The dashed lines 19 of this prior segmentation may be compared with the bold lines 18 representing the segmentation according to the method of FIG. 6 that was performed on a combination of the subtraction data and the non-contrast data.

The bold lines 18 (method of FIG. 6) show improved segmentation and estimation of stenosis over the segmentation and estimation of stenosis that were achieved using the prior segmentation process that is based on subtraction data alone. Although quantitative QCA (Quantitative Coronary Angiography) data was not available for the data set used for FIGS. 10(a), 10(b), 11(a) and 11(b), the segmentation results that were obtained using the method of FIG. 6 agree more with the Agatston scores and the clinician's interpretation of that image data.

The segmentation process of FIG. 6 may provide benefit to clinicians since it is more in accordance with the assessment provided by a clinician than methods of segmentation based on the subtraction data alone.

Figures 12A, 12B, 12C:
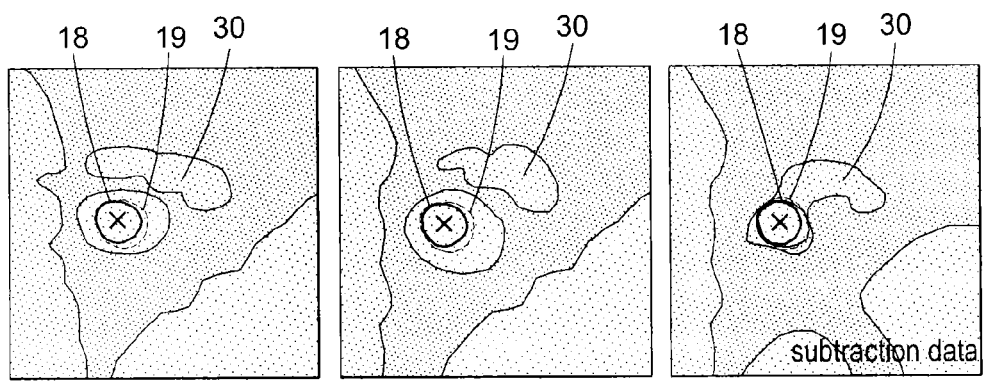
FIGS. 12(a), 12(b) and 12(c) show results of lumen segmentations according to FIG. 6 in which calcium deposits are present, overlaid with results of the known vessel segmentation method for the same data.

FIGS. 12(a), 12(b) and 12(c) show further examples of subtraction images in which a segmentation according to the method of FIG. 5, based on both the subtraction image data and the non-contrast image data, is compared with a segmentation method based on the subtraction data alone. Each of the images includes an area of subtracted calcium 30. The line representing the bounds of the segmentation according to the method of FIG. 6 is shown as a bold line 18. The line representing the segmentation based on the subtraction data alone is shown as a dashed line 19.

It may be seen that in each of FIGS. 12(a), 12(b) and 12(c), the area enclosed by the bold line 18 is smaller than the area enclosed by the dashed line 19. It had been found previously that segmentation of the vessel that is based on subtraction data alone may tend to overestimate the lumen. The segmentation achieved by the method of FIG. 6 agrees better with the clinician's interpretation than a segmentation of the same vessel that is based on the subtraction data alone. Using the method of FIG. 6 may result in an improvement in segmentation results for data in which calcium is present, when compared with segmentation based on the subtraction data alone.

Figures 13A, 13B, 13C:
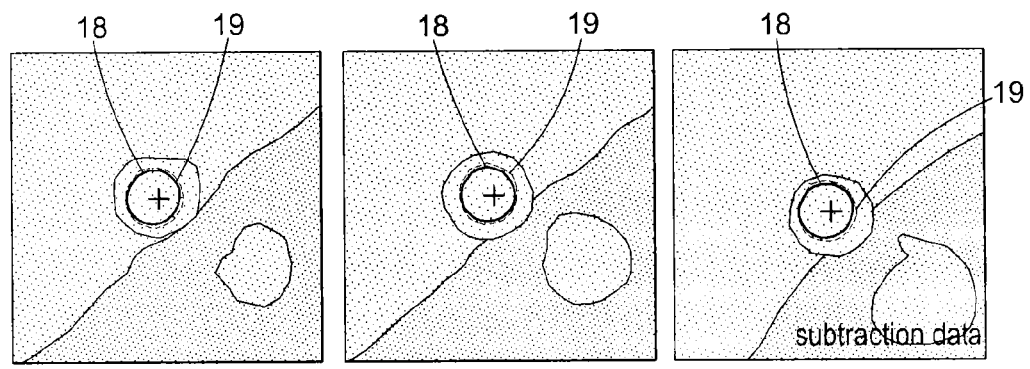
FIGS. 13(a), 13(b) and 13(c) show results of lumen segmentations according to FIG. 6 in which no calcium deposits are present, overlaid with results of the known vessel segmentation method for the same data.

FIGS. 13(a), 13(b) and 13(c) show examples of subtraction data in which no calcium is found to be present. The line representing the bounds of the segmentation according to the method of FIG. 6 is shown as a bold line 18. The line representing the segmentation based on the subtraction data alone is shown as a dashed line 19. It may be seen that for each of FIG. 13(a), FIG. 13(b) and FIG. 13(c), the area enclosed by the bold line 18 is substantially similar to the area enclosed by the dashed line 19. Therefore there is no significant change in the segmentation result in the absence of calcium between the method of FIG. 6 and a segmentation method based on the subtraction data alone.

Although embodiments have been described in relation to the segmentation of CT data, embodiments may be used to segment any suitable type of medical image data, for example X-ray data, MRI data or PET data. Medical image data may include veterinary image data. Although embodiments have been described in relation to data from non-contrast images and subtraction images, any image types from which different features can be classified may be used. The medical image data may relate to any part of the body.

Whilst particular units have been described herein, in alternative embodiments functionality of one or more of these units can be provided by a single unit, processing resource or other component, or functionality provided by a single unit can be provided by two or more units in combination. Reference to a single unit encompasses multiple components providing the functionality of that unit, whether or not such components are remote from one another, and reference to multiple units encompasses a single component providing the functionality of those units.

Whilst certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An apparatus for segmentation of medical image data, comprising:
    processing circuitry configured to
        receive a first set of image data and a second set of image data, different from the first set of image data, wherein a structure is represented in both the first set of image data and the second set of image data;
        determine a classification of a first type of feature from the first set of image data and determine a classification of a second type of feature from the second set of image data, the first type of feature comprising at least one of a calcification and a stent, the first set of image data comprising non-contrast data, the second type of feature comprising a vessel tissue type, and the second set of image data comprising at least one of subtraction data and contrast data; and identify image data representing the structure in dependence on both the classification of the first type of feature from the first set of image data and the classification of the second type of feature from the second set of image data.

2. The apparatus according to claim 1, wherein the processing circuitry is further configured to at least one of
determine the classification of the first type of feature from the first set of image data and from at least one further set of image data;
determine the classification of the second type of feature from the second set of image data and from at least one further set of image data.

3. The apparatus according to claim 1, wherein the processing circuitry is further configured to identify image data representing the structure from a set of image data, wherein the set of image data comprises at least one of the first set of image data, the second set of image data and a combined set of image data.

4. The apparatus according to claim 1, wherein the processing circuitry is further configured to identify the image data representing the structure, wherein the structure comprises a vessel.

5. The apparatus according to claim 4, wherein identifying image data representing the structure results in a segmentation of the structure, and the processing circuitry is further configured to use the resulting segmentation of the structure to quantify stenosis of the vessel.

6. The apparatus according to claim 1 wherein each of the first set of image data and the second set of image data comprises a respective plurality of voxels,
the processing circuitry is further configured to determine the classification of the first type of feature in the first set of image data by determining a respective classification of each of a plurality of voxels of the first set of image data, and
the processing circuitry is further configured to determine the classification of the second type of feature in the second set of image data by determining a respective classification of each of a plurality of voxels of the second set of image data.

7. The apparatus according to claim 1, wherein the processing circuitry is further configured to determine the classification of the first type of feature by determining for each of a plurality of voxels of the first set of image data a likelihood that the voxel represents the first type of feature, and determine the classification of the second type of feature by determining for each of a plurality of voxels of the second set of image data, a likelihood that the voxel represents the second type of feature.

8. The apparatus according to claim 7, wherein the processing circuitry is further to identify image data representing the structure by performing a level set, and wherein a speed function of the level set is determined in dependence on at least one of the first and second likelihoods.

9. The apparatus according to claim 1, wherein the processing circuitry is further configured to determine at least one of the classification of the first type of feature and the classification of the second type of feature by performing an unsupervised classification technique.

10. The apparatus according to claim 1, wherein the processing circuitry is further configured to receive the first set of image data, which is aligned with the second set of image data in accordance with a registration.

11. The apparatus according to claim 1, wherein the processing circuitry is further configured to perform an approximate segmentation of the structure in at least one of the first set of image data and the second set of image data, and the processing circuitry is further configured to at least one of:
determine the classification of the first type of feature by determining a classification of the first type of feature in image data of the first set of image data representing the approximately segmented structure; and
determine the classification of the second type of feature by determining a classification of the second type of feature in image data of the second set of image data representing the approximately segmented structure.

12. The apparatus according to claim 1,
wherein the first set of image data comprises a plurality of voxels each having a respective value, and
the processing circuitry is further configured to determine the classification of the first type of feature by selecting a subset of voxels from the plurality of voxels in dependence on a comparison between the value of each voxel and a threshold value.

13. The apparatus according to claim 12, wherein the processing circuitry is further configured to determine the classification of the first type of feature by determining the threshold value, and determine the threshold value by determining a selection parameter for each of a plurality of candidate threshold values.

14. The apparatus according to claim 13, wherein the processing circuitry is further configured to determine the selection parameter, which comprises a Bayesian Information Criterion.

15. The apparatus according to claim 12, wherein the processing circuitry is further configured to determine the classification of the first type of feature by performing connected component analysis on the subset of voxels.

16. The apparatus according to claim 15, wherein the processing circuitry is further configured to determine the classification of the first type of feature by fitting an intensity distribution to at least one discrete region obtained from the connected component analysis.

17. The apparatus according to claim 16, wherein the processing circuitry is further configured to fit the intensity distribution by using an unsupervised learning technique.

18. The apparatus according to claim 17, wherein the processing circuitry is further configured to use the unsupervised learning technique, which comprises at least one of: a Gaussian Mixture Model, k-Means, and Expectation Maximization.

19. The apparatus according to claim 1, wherein the processing circuitry is further configured to determine the classification of the second type of feature by:
dividing the second set of image data into sections;
grouping the sections into regions and applying a weighted kernel to each region;
applying a multi-class distribution to each region; and
for each region, determining a classification of the second type of feature based on a classification algorithm.

20. The apparatus according to claim 1, wherein the processing circuitry is further configured to receive the first image data and the second image data, each of which comprises volumetric medical image data.

21. The apparatus according to claim 1, wherein the processing circuitry is further configured to receive the first set of image data and the second set of image data, each of which comprises at least one of: CT data, MRI data, PET data, and SPECT data.

22. A method for segmentation of medical image data, comprising:
   obtaining a first set of image data representing a first medical image and a second set of image data, different from the first set of image data, representing a second medical image, wherein at least one structure is represented in both the first set of image data and the second set of image data;
   determining a classification of a first type of feature from the first set of image data, the first type of feature comprising at least one of a calcification and a stent, the first set of image data comprising non-contrast data;
   determining a classification of a second type of feature from the second set of image data, the second type of feature comprising a vessel tissue type, and the second set of image data comprising at least one of subtraction data and contrast data; and
   identifying image data representing the structure in dependence on both the classification of the first type of feature from the first set of image data and the classification of the second type of feature from the second set of image data.

23. A non-transitory computer-readable storage medium storing a computer program for performing a method according to claim 22.

* * * * *